April 23, 1940. S. MENDELSOHN 2,197,871
SYNCHRONIZING TESTER
Original Filed July 12, 1938  2 Sheets-Sheet 1
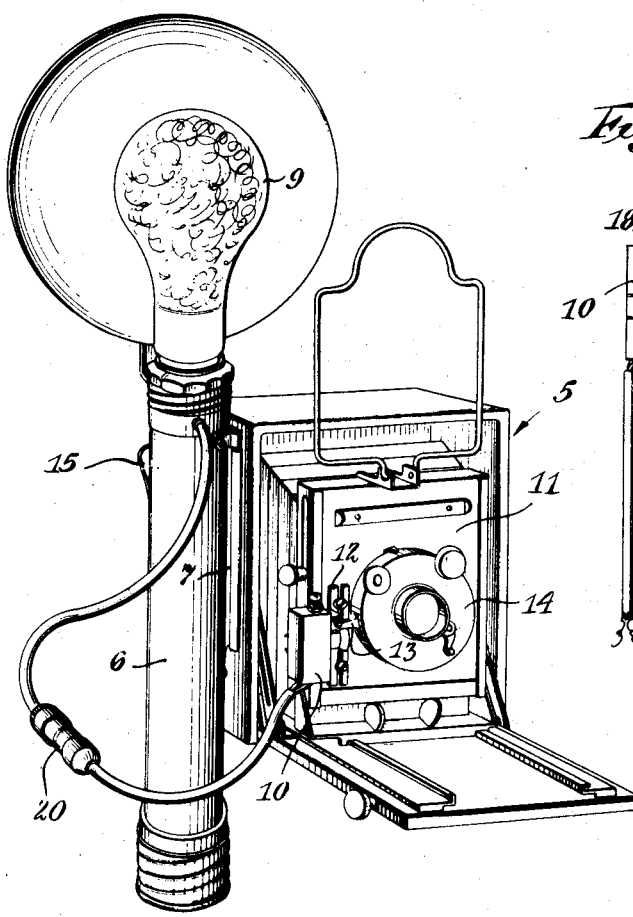
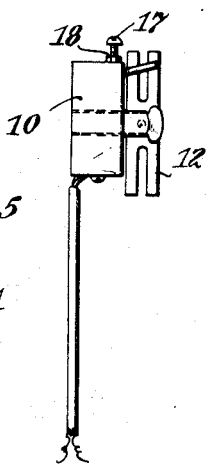
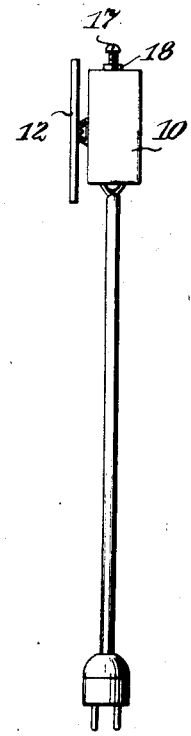
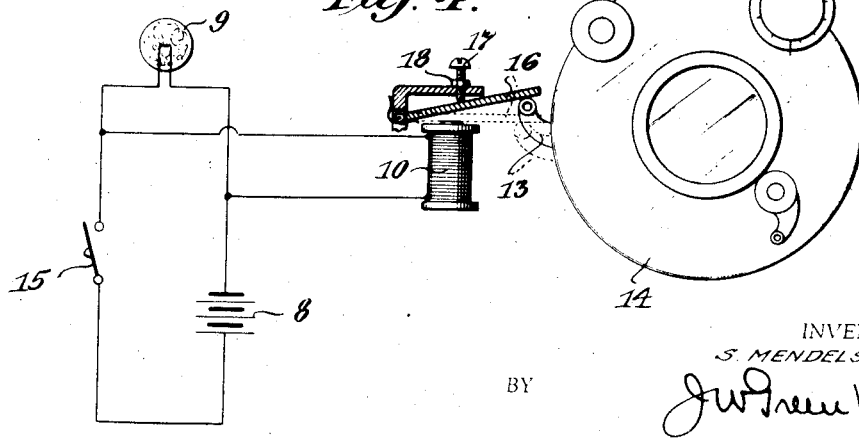
INVENTOR.
S. MENDELSOHN
BY
ATTORNEY.

April 23, 1940.　　　S. MENDELSOHN　　　2,197,871
SYNCHRONIZING TESTER
Original Filed July 12, 1938　　2 Sheets-Sheet 2
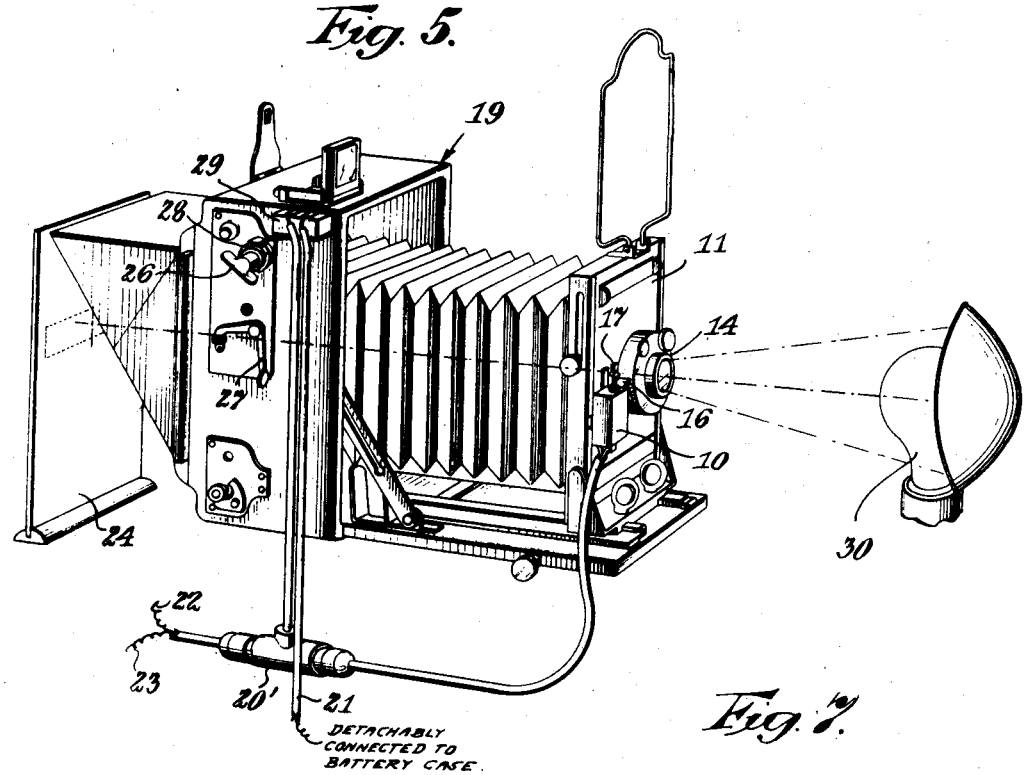
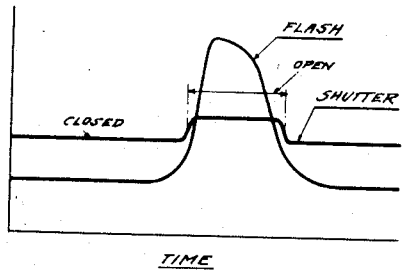
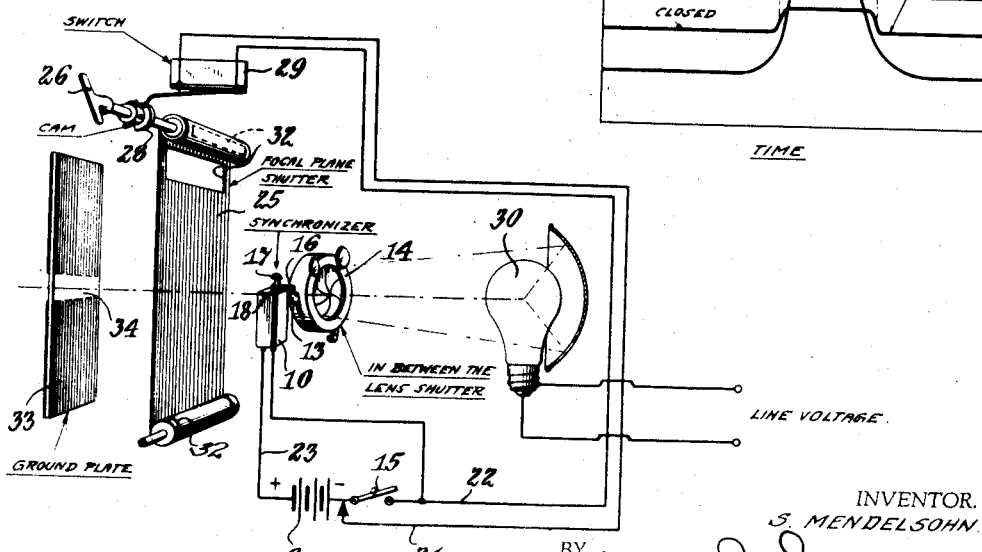
INVENTOR.
S. MENDELSOHN
ATTORNEY.

Patented Apr. 23, 1940

2,197,871

UNITED STATES PATENT OFFICE 2,197,871

SYNCHRONIZING TESTER

Samuel Mendelsohn, Brooklyn, N. Y.

Application July 12, 1938, Serial No. 218,730
Renewed April 12, 1939

12 Claims. (Cl. 88—14)

The present invention relates to a testing device for regulating the opening of a camera shutter and has particular reference to a device for accurately synchronizing a camera shutter and a synchronizing apparatus.

In the photographic art it is now well known to employ photoflash lamps, for supplying instantaneous illumination, instead of magnesium powder as formerly used. However, it is essential for best results that complete opening of the camera shutter occurs at the instant of peak intensity of the photoflash lamp, otherwise the resulting exposure will be defective from the standpoint of definition.

To remedy this objection synchronizing apparatus has been developed which forms an integral part of a camera and operates to cause maximum opening of the camera shutter simultaneously with the moment of peak intensity from the photoflash lamp. One such synchronizing apparatus is shown and described in my copending application Serial No. 101,782, filed September 21, 1936.

Inasmuch as the speed of opening of shutters varies with different cameras it is necessary to adjust the synchronizing apparatus to each particular shutter so as to obtain absolute synchronization. Once synchronization has been established for a given camera shutter it need not be further disturbed and will remain in synchronization indefinitely unless the shutter or mechanism is subjected to shocks and jars.

However, it is necessary to initially adjust the apparatus for absolute synchronization and to readjust the apparatus once it gets out of adjustment, which frequently occurs, particularly in instances of newspaper photography where cameras do, as a matter of fact, receive abusive treatment.

It is accordingly an object of the present invention to provide a synchronization testing apparatus for accurately timing the operation of a device such as a camera shutter.

Another object of the present invention is the provision of a testing apparatus which enables the rapid and accurate adjustment of the synchronizing speed between a camera shutter and a synchronizing apparatus.

Another object of the present invention is the provision of a testing apparatus to which a camera shutter may be attached and adjusted so as to completely open simultaneously with maximum intensity from a photoflash lamp.

Another object of the present invention is the provision of a testing device for accurately determining the speeds of camera shutters such as a focal plane shutter and the between the lens shutter.

Still further objects of the present invention will become obvious to those skilled in the art by reference to the accompanying drawings wherein:

Fig. 1 is a front perspective view of a conventional type of camera utilizing a photoflash lamp synchronizing mechanism for opening the camera shutter at the peak of maximum intensity from a photoflash lamp.

Fig. 2 is a front view of the shutter operating relay.

Fig. 3 is a side view of the shutter operating relay.

Fig. 4 is a diagrammatic illustration of the electrical circuit of the synchronizing mechanism together with the camera shutter and operating relay.

Fig. 5 is a side perspective view of the test camera in position for checking synchronization of the mechanism.

Fig. 6 is a schematic diagram of the apparatus for checking the synchronization of a camera shutter and a synchronizing mechanism, and Fig. 7 is a graphic illustration showing the relationship of camera shutter opening to maximum intensity of the photoflash lamp.

Referring now to the drawings in detail a camera 5 is shown in Fig. 1 to which a synchronizing mechanism is attached. This mechanism may be of the type shown in my above mentioned pending application and comprises a battery case 6 which is secured by a suitable bracket or the like 7 to the side of the camera. This battery case houses a pair of dry cell batteries 8 (Fig. 4) which serve as the source of electrical energy for a photoflash lamp 9 and for energizing a shutter operating relay 10.

The relay 10 is fastened to the lensboard 11 of the camera 5 by a bracket 12 as may be seen in Figs. 2 and 3, and when once adjusted so as to properly trip the shutter arm 13, of the camera shutter 14, the bracket need not be again disturbed. By reference to Fig. 4 it will be seen that upon closure of a suitable switch 15 attached to the battery case, electrical energy is supplied from the batteries 8 to the photoflash lamp 9 and the winding of relay 10. The photoflash lamp begins to ignite and in a brief moment reaches the peak of its intensity of illumination. At the same time the photoflash lamp is ignited the armature 16 of the relay 10 is attracted and since it is in contact with the trip arm 13 of the shutter 14 causes opening of the shutter.

In order to effect complete opening of the shutter simultaneously with the moment of peak intensity from the photoflash lamp, as shown in Fig. 7, it is only necessary to regulate the adjusting screw 17 to increase or decrease the travel of the relay armature 16 after which it may be locked in place by a locknut 18. This adjustment accordingly governs the length of travel of the shutter trip 13 so that it has a greater or lesser distance to move to completely open the shutter 14 during the period between ignition and peak intensity of the photoflash lamp 9.

Once the proper adjustment has been made at the factory it need not, as previously mentioned, be again disturbed unless the camera is subjected to shocks severe enough to cause non-synchronization. For the purpose of initially adjusting the synchronizing mechanism and for readjusting it as often as found necessary, the present invention contemplates a testing apparatus, as shown in Figs. 5 and 6, which enables rapid and accurate adjustment.

By specific reference to Fig. 5 the testing device of the present invention is shown in the form of a camera 19 to which is attached the lensboard 11 carrying the camera shutter to be synchronized. Inasmuch as the relay 10 has previously been affixed to this lensboard, it is only necessary to disconnect the detachable connector 20 when removing the lensboard from the camera and to reconnect the relay 10 to the detachable connector 20' of the test camera. The battery case 6 from the camera to be tested is also connected to the connector 20' of the test camera, as shown in Fig. 5, and the conductor 21 attached to the metallic portion of the battery case, such as by a spring clip or the like, so that an automatically operated switch, as hereinafter mentioned, is connected in parallel relation to the battery case switch 15 and controls the relay 10. This accordingly conditions the testing apparatus for operation since the batteries 8 are connected by conductors 22 and 23 to the relay 10 as shown in Fig. 6.

The test camera 19 as shown is of the focal plane shutter type wherein the focal plane shutter 25 (Fig. 6) is "cocked" by rotation of a knob 26 and released by tripping of a catch 27 (Fig. 5). As can be seen the setting knob 26 is provided with an eccentric or cam 28 which is contacted by a switch arm of an electric switch 29 adjustably fastened to the side of the test camera 19.

When the catch 27 is released the focal plane shutter 25, as is well known in the camera art, moves downwardly as viewed in Fig. 6. This accordingly rotates the knob 26 and the eccentric 28 with the result that the switch 29 is automatically closed causing energization of the relay 10 and opening of the shutter 14 carried by the lensboard from the camera to be synchronized as can be readily appreciated from the circuit arrangement shown in Fig. 6. Disposed in front of the test camera is a source of illumination such as the usual domestic incandescent lamp 30 so that light will be projected through the shutter 14 when opened which falls upon the focal plane shutter 25. Inasmuch as this focal plane shutter is provided with the customary slit 32 the illumination from the source 30 can be observed through the slit 32 upon opening of shutter 14. Disposed rearwardly of the focal plane shutter 25 of the test camera 19 in place of the usual photographic plate is a ground glass plate 33 which may be marked with suitable indicia such as graduated lines or black paper glued thereto to leave clear openings 34.

To facilitate observation from the front or sides of the camera an additional ground glass plate or mirror 24 may be disposed in back of the ground glass plate 33 of the camera as shown in Fig. 5.

The positioning of the indicia or clear openings 34 is determined by the flashing of a number of photoflash lamps of a given size and manufacture from which an average of the moment of peak intensity is obtained. This having been established and marked on the ground glass plate is thus representative of the moment of peak intensity. Accordingly upon operation of the testing camera or mechanism with attendant movement of the focal plane shutter slit 32 downwardly, as before mentioned, the operator merely observes the light cast upon the ground glass plate when the shutter 14 opens.

In the event the camera shutter 14 together with its relay 10, which forms part of the synchronizing mechanism to be tested, operates too rapidly, the light from the source 30 will be projected through the slit 32 and show above the clear opening 34 on the ground glass plate 33. On the other hand if the camera shutter opens too late, the light will fall upon the ground glass plate below the clear opening 34.

To properly adjust the mechanism, the operator merely loosens the locknut 18 and moves the adjusting screw 17 up or down as required until, by repeated testing, the slit 32 coincides with the clear opening 34 in the ground glass plate at the moment that the shutter 14 opens to thus allow the light from the source 30 to be observed in alignment with the clear opening 34. This accordingly indicates that the mechanism is in perfect synchronism enabling the operator to then again tighten the locknut 18 to maintain the adjusting screw 17 in fixed position.

The lensboard 11 together with the integral shutter 14 and relay 10 is then ready to be installed in the original camera 5 and connected to the synchronizing mechanism affixed thereto, as shown in Fig. 1. In some make cameras the lensboard is not readily removable so that it can be directly connected to the test camera. When it is necessary to test a synchronizing mechanism with this latter type camera or any other type, the testing mechanism of the present invention functions in the identical manner.

However, the camera to be tested under these circumstances is disposed between the test camera 19 and the light source 30 with the lensboard of the test camera completely removed so that there is no intervening shutter to completely open between the shutter to be adjusted and the focal plane shutter of the test camera and if the camera to be tested happens to be of the focal plane shutter type this latter shutter must be at open position. Inasmuch as the camera to be tested is provided with a relay similar to the relay 10, the operator simply adjusts the set screw 17 until the light from the source 30 falls upon the clear opening 34 of the ground glass plate after being projected through the slit 32 of the focal plane shutter of the test camera and the shutter of the camera to be tested upon opening of the latter.

It is also possible to employ the testing apparatus herein described to determine the rate of movement of the focal plane shutter and the between the lens shutter simply by utilizing one of these shutters, which has previously been checked for a given accuracy, as a guide and adjusting the speed of the remaining shutter to correspond to the accurate shutter. Moreover, since the focal plane shutter may be provided with the customary slits of various widths, by regulating its speed of movement so as to make a slit of predetermined width align with the between the lens shutter at the moment of opening, the device itself can be employed as a synchronizer of camera shutters as well as an apparatus for testing the synchronization between cameras and a photoflash lamp.

It thus becomes obvious to those skilled in the art that a testing apparatus for accurately testing the synchronization of a camera shutter and a synchronizing apparatus for igniting photoflash lamps is herein provided. By the utilization of this apparatus the opening of the shutter of any make camera can be adjusted so that complete opening occurs simultaneously with the moment of peak intensity of a photoflash lamp. Moreover, once a camera has been properly synchronized it need not be further disturbed unless severely jarred so as to cause non-synchronization. However, in such event the entire synchronizing mechanism can immediately be again regulated by subjecting the shutter to the testing mechanism.

Although one embodiment of the present invention has been herein shown and described it is to be understood that other modifications of the same may be made without departing from the spirit and scope of the appended claims.

What is claimed is:

1. A testing device for accurately adjusting a synchronizing apparatus normally operative to cause complete opening of a camera shutter simultaneously with the moment of peak intensity from a photoflash lamp comprising movable means provided with an opening therein, means disposed on one side of said movable means having indicia thereon representative of the moment of peak intensity of a photoflash lamp, a source of illumination disposed on the opposite side of said movable means, a camera shutter to be synchronized disposed between said source and said movable means, and means operative to simultaneously cause movement of said movable means and opening of said camera shutter to be tested with attendant projection of illumination from said source through said camera shutter and the opening in said movable means upon said second mentioned means, for the purpose of indicating the adjustment required to said camera shutter in order to cause the illumination from said source to coincide with the indicia on said second mentioned means.

2. A testing device for accurately adjusting a synchronizing apparatus normally operative to cause complete opening of a camera shutter simultaneously with the moment of peak intensity from a photoflash lamp comprising a camera provided with movable means having an opening therein, a plate disposed on one side of said movable means having indicia thereon representative of the moment of peak intensity of a photoflash lamp, a source of illumination disposed on the opposite side of said movable means, a camera shutter to be synchronized disposed between said source and said movable means, and means operative to simultaneously cause movement of said movable means and opening of said camera shutter to be tested with attendant projection of illumination from said source through said camera shutter and the opening in said movable means upon said plate, for the purpose of indicating the adjustment required to said camera shutter to be tested to cause illumination from said source to coincide with the indicia on said plate.

3. A testing device for accurately adjusting a synchronizing apparatus normally operative to cause complete opening of a camera shutter simultaneously with the moment of peak intensity from a photoflash lamp comprising a camera provided with a movable shutter having an opening therein, a plate carried by said camera on one side of said movable shutter having indicia thereon representative of the moment of peak intensity of a photoflash lamp, a source of illumination disposed on the opposite side of said movable shutter, a camera shutter to be synchronized disposed between said source and said movable shutter, and means operative to simultaneously cause movement of said movable shutter and opening of said camera shutter to be tested with attendant projection of illumination from said source through said camera shutter to be tested and the opening in said movable shutter upon said plate, for the purpose of indicating the adjustment required to said camera shutter to be tested to cause the illumination from said source to coincide with the indicia on said plate.

4. A testing device for accurately adjusting a synchronizing apparatus normally operative to cause complete opening of a camera shutter simultaneously with the moment of peak intensity from a photoflash lamp comprising a test camera provided with a movable shutter having an opening therein, shutter setting means for placing said shutter under tension preparatory to movement thereof, shutter releasing means operative to render said shutter setting means ineffective and to cause movement of said shutter, a plate carried by said test camera on one side of said movable shutter having indicia thereon representative of the moment of peak intensity of a photoflash lamp, a source of illumination disposed on the opposite side of said movable shutter, a camera shutter to be synchronized disposed between said source and said movable shutter and provided with shutter opening and adjusting mechanism, and means connected to said shutter to be tested and operable by movement of said movable shutter to cause opening of said shutter to be tested with attendant projection of illumination therethrough and through the opening in said movable shutter upon said plate, to enable an operator to determine the position of the projected illumination with respect to the indicia on said plate and to adjust said shutter to be tested until the illumination from said source coincides with the indicia.

5. A testing device for accurately adjusting a synchronizing apparatus normally operative to cause complete opening of a camera shutter simultaneously with the moment of peak intensity from a photoflash lamp comprising a test camera provided with a movable shutter having an opening therein and normally tensioned for movement, an electric switch carried by said test camera and operable by movement of said movable shutter to open and close its contacts, a trip lever operable to cause movement of said movable shutter, a plate carried by said test camera on one side of said movable shutter having indicia thereon representative of the moment of peak intensity of a photoflash lamp, a source of illumination disposed on the opposite side of said movable shutter, a camera shutter to be synchronized disposed between said source and said movable shutter and provided with a relay for opening said camera shutter and having an adjusting arrangement to regulate the speed of opening of said shutter, and an electrical circuit including the electric switch carried by said test camera and the relay of said camera shutter to be tested and operable upon movement of said movable shutter with attendant closure of said switch to cause operation of said relay and projection of illumination through said shutter to be tested and the opening in said movable shutter upon said plate, to enable an operator to adjust the adjusting arrangement of said camera shutter to be tested until the illumination falling on said plate coincides with predetermined indicia thereon.

6. A testing device for accurately adjusting a synchronizing apparatus normally operative to cause complete opening of a camera shutter simultaneously with the moment of peak intensity from a photoflash lamp comprising a test camera provided with a movable shutter, a plate disposed on one side of said movable shutter having indicia thereon representative of the moment of peak intensity of a photoflash lamp, a source of illumination on the opposite side of said movable shutter, a camera shutter to be tested disposed between said source of illumination and said movable shutter provided with an adjusting arrangement to regulate the speed of opening of said shutter to be tested, and means operable to simultaneously cause movement of said movable shutter and opening of said shutter to be tested and the projection of light from said source through both said shutters upon said plate, to enable an operator to observe the position of projected light on said plate and to regulate the adjusting arrangement of said shutter to be tested until the projected light coincides with the indicia on said plate.

7. A testing device for determining the speed of camera shutters comprising a camera provided with a between the lens shutter and a focal plane shutter, means operable to cause movement of said focal plane shutter, and means operable upon movement of said focal plane shutter to cause opening of said between the lens shutter after the lapse of a preselected time interval following initial movement of said focal plane shutter.

8. A testing device for determining the speed of camera shutters comprising a camera provided with a between the lens shutter and a focal plane shutter, means operable to cause movement of said focal plane shutter, means carried by said camera and engaging a portion of the means for moving said focal plane shutter, and means engaging said between the lens shutter and connected to said second mentioned means and operable upon movement of said focal plane shutter to cause opening of said between the lens shutter after the lapse of a preselected time interval following initial movement of said focal plane shutter.

9. A synchronizing device for synchronizing camera shutters comprising a camera provided with a between the lens shutter and a focal plane shutter having transverse slits of various widths, means for causing movement of said focal plane shutter, and means operable upon movement of said focal plane shutter to cause opening of said between the lens shutter after the lapse of a preselected time interval following initial movement of said focal plane shutter, to align any one of the slits of said focal plane shutter with said between the lens shutter at the moment of opening of the latter.

10. A synchronizing device for synchronizing camera shutters comprising a camera provided with a between the lens shutter and a focal plane shutter having transverse slits of various widths, means for causing movement of said focal plane shutter, means carried by said camera and engaging a portion of said shutter moving means, and means engaging said between the lens shutter and connected to said shutter moving means and operable upon movement of said focal plane shutter to cause opening of said between the lens shutter after the lapse of a preselected time interval following initial movement of said focal plane shutter, to align any desired width slit of the latter shutter with the between the lens shutter at the moment of opening thereof.

11. A synchronizing device comprising a camera having a lens and provided with a focal plane shutter having transverse slits of various widths, means for causing movement of said focal plane shutter to align any one of said various width slits with the axis of said lens after the lapse of a predetermined period of time, means disposed on one side of said focal plane shutter having indicia thereon representative of the moment of peak intensity of a photoflash lamp, and a source of illumination on the opposite side of said lens to that of said focal plane shutter for projecting light on said second-mentioned means through one of said various width slits to enable an operator to observe the position of projected light on said second-mentioned means and to adjust the speed of said first-mentioned means until the projected light through any desired one of said slits coincides with the indicia on said second-mentioned means.

12. A synchronizing device comprising a camera having a lens and provided with a focal plane shutter having transverse slits of various widths, means for causing movement of said focal plane shutter to align any one of said various width slits with the axis of said lens after the lapse of a predetermined period of time, a plate disposed on one side of said focal plane shutter having indicia thereon representative of the moment of peak intensity of a photoflash lamp, and a source of illumination on the opposite side of said lens to that of said focal plane shutter for projecting light on said plate through one of said various width slits to enable on operator to observe the position of projected light on said plate and adjust the speed of said means until the projected light through any desired one of said slits coincides with the indicia on said plate.

SAMUEL MENDELSOHN.